United States Patent
Matsuo et al.

(10) Patent No.: US 9,165,568 B2
(45) Date of Patent: Oct. 20, 2015

(54) HARD DISK DRIVE AND DATA REFRESH METHOD

(71) Applicant: KABUSHIKI KAISHA TOSHIBA, Minato-ku, Tokyo (JP)

(72) Inventors: Takashi Matsuo, Fujisawa (JP); Takumi Sato, Karnakura (JP)

(73) Assignee: Kabushiki Kaisha Tosbhia, Tokyo (JP)

( * ) Notice: Subject to any disclaimer, the term of this patent is extended or adjusted under 35 U.S.C. 154(b) by 0 days.

(21) Appl. No.: 14/294,970

(22) Filed: Jun. 3, 2014

(65) Prior Publication Data

US 2015/0255091 A1    Sep. 10, 2015

Related U.S. Application Data

(60) Provisional application No. 61/947,690, filed on Mar. 4, 2014.

(51) Int. Cl.
  *G11B 5/09*  (2006.01)
  *G11B 27/36*  (2006.01)

(52) U.S. Cl.
  CPC ........................................ *G11B 5/09* (2013.01)

(58) Field of Classification Search
  CPC .... G11B 27/36; G11B 5/012; G11B 2220/20; G11B 19/04; G11B 15/04; G11B 5/02; G11B 5/60005; G11B 5/59633; G11B 5/59655
  USPC ......... 360/53, 31, 77.04, 77.05, 77.08, 77.02, 360/48, 75, 67
  See application file for complete search history.

(56) References Cited

U.S. PATENT DOCUMENTS

| | | | |
|---|---|---|---|
| 5,193,072 A | 3/1993 | Frenkil et al. | |
| 5,321,560 A * | 6/1994 | Cowen | 360/48 |
| 6,462,896 B1 | 10/2002 | Codilian et al. | |
| 6,563,755 B2 | 5/2003 | Yahata et al. | |
| 6,567,091 B2 | 5/2003 | Dye et al. | |
| 7,149,160 B2 | 12/2006 | Kibashi et al. | |
| 7,173,782 B2 | 2/2007 | Ikeda et al. | |
| 7,177,979 B2 | 2/2007 | Kuwamura | |

(Continued)

FOREIGN PATENT DOCUMENTS

| | | |
|---|---|---|
| JP | 03-035477 | 2/1991 |
| JP | 04-052725 | 2/1992 |
| JP | 2002-100126 A | 4/2002 |
| JP | 2004-273060 | 4/2002 |
| JP | 2005-267702 | 9/2005 |
| JP | 2008-257782 A | 10/2008 |
| JP | 2011-028810 A | 2/2011 |

OTHER PUBLICATIONS

Final Notice of Rejection mailed by Japan Patent Office on Dec. 8, 2009 in Japanese patent application No. 2008-186317 corresponding to U.S. Pat. No. 7,925,828 B2.

(Continued)

*Primary Examiner* — Nabil Hindi
(74) *Attorney, Agent, or Firm* — Knobbe, Martens, Olson & Bear, LLP

(57) ABSTRACT

According to one embodiment, a hard disk drive includes a detecting circuit configured to detect abnormality of a supply voltage. The hard disk drive also includes a refresh controller configured to, when the abnormality of the supply voltage is detected during a data refresh process in sector units to a magnetic disk, finish the data refresh process to a sector after writing of data to a data area is finished, the data area to which the writing is performed when the abnormality of the supply voltage is detected, without stepping over a servo area.

12 Claims, 3 Drawing Sheets

(56) References Cited

U.S. PATENT DOCUMENTS

| | | |
|---|---|---|
| 7,382,673 B2 | 6/2008 | Hummler |
| 7,522,366 B2 | 4/2009 | Mettler et al. |
| 7,567,400 B2 | 7/2009 | Cheng |
| 7,925,828 B2 | 4/2011 | Aoki et al. |
| 8,154,814 B2 | 4/2012 | Aoki et al. |
| 8,320,067 B1 | 11/2012 | Tsai et al. |
| 2004/0193798 A1 | 9/2004 | Kuwamura |
| 2006/0066971 A1 | 3/2006 | Alex et al. |
| 2008/0005645 A1 | 1/2008 | Takemura et al. |
| 2008/0137847 A1 | 6/2008 | Candelore et al. |
| 2009/0027799 A1 | 1/2009 | Rothberg et al. |
| 2009/0244775 A1 | 10/2009 | Ehrlich |

OTHER PUBLICATIONS

Information Sheet for preparing an Information Disclosure Statement under Rule 1.56.

Notice of Reasons for Rejection mailed by Japan Patent Office on Sep. 7, 2010 in Japanese patent application No. 2009-173501 corresponding to U.S. Pat. No. 8,154,814 B2.

* cited by examiner

HARD DISK DRIVE AND DATA REFRESH METHOD

CROSS-REFERENCE TO RELATED APPLICATIONS

This application is based upon and claims the benefit of priority from U.S. Provisional Application No. 61/947,690, filed on Mar. 4, 2014; the entire contents of which are incorporated herein by reference.

FIELD

This embodiment generally relates to a hard disk drive and a data refresh method.

BACKGROUND

In a conventional hard disk drive, recording density becomes higher with higher capacity and an interval between adjacent tracks on a disk becomes narrower. Therefore, when data is magnetically written to the track, data of the adjacent track might be magnetically deteriorated. In a recent hard disk drive, data refresh (rewrite) is performed for recovering data deterioration in the adjacent track due to data write operation. For example, the data written to the track adjacent to the track in which the number of times of data writing reaches a prescribed number is read and the read data is rewritten to the same track.

When power shutdown or a voltage drop occurs during the writing to the disk, the hard disk drive finishes the writing after writing to the end of one sector to which the writing is performed at that time. However, when the sector length is long, there is possibility that the writing to one sector cannot be completed due to the voltage shutdown or voltage drop and write data is interrupted in a halfway position of the sector. In the case of the data refresh also, in the hard disk drive, when the power is shut down during operation to rewrite the data read from the track to be refreshed to the same track, the data might be lost. As a measure against this, there is a case in which the read data to be refreshed is stored in a backup area in advance and then rewritten to the track from which this is read.

However, when the backup is performed, the data refresh takes time.

DETAILED DESCRIPTION

In general, according to one embodiment, a hard disk drive includes a magnetic disk on which data is recorded in a data area separated with a servo area. The hard disk drive also includes a control unit configured to control reading and writing of the data from and to the magnetic disk. The control unit includes a detecting circuit configured to detect abnormality of a supply voltage supplied to the control unit. The control unit also includes a refresh controller configured to, when the abnormality of the supply voltage is detected by the detecting circuit during a data refresh process in sector units to the magnetic disk, finish the data refresh process to the sector after the writing of the data to the data area is finished, the data area to which the writing is performed when the abnormality of the supply voltage is detected, without stepping over the servo area.

Exemplary embodiments of a hard disk drive and data refresh method will be explained below in detail with reference to the accompanying drawings. The present invention is not limited to the following embodiments.

First Embodiment

Figure 1:
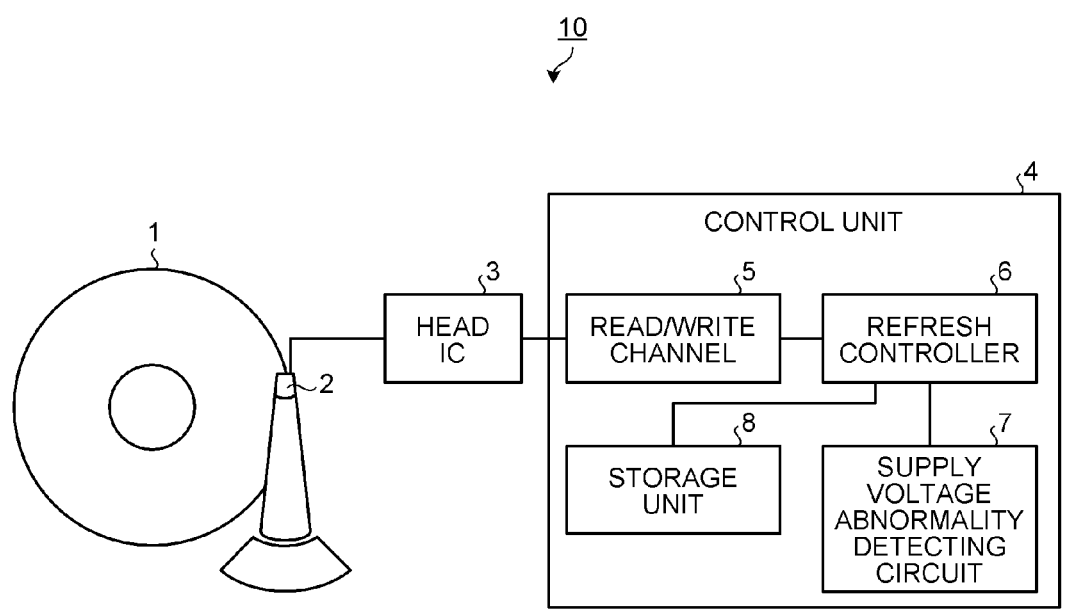
FIG. 1 is a diagram showing a configuration example of a hard disk drive.

FIG. 1 is a diagram illustrating a configuration example of a hard disk drive 10 of this embodiment. The hard disk drive 10 includes a magnetic disk 1, a head 2, a head IC (integrated circuit) 3, and a control unit 4. The control unit 4 includes a read/write channel 5, a refresh controller 6, a supply voltage abnormality detecting circuit 7, and a storage unit 8.

The data is recorded on the magnetic disk 1 being a recording medium in the data area separated with the servo area. The head 2 includes a read head and a write head to read/write the data from/to the magnetic disk 1. The head IC 3 amplifies a signal read from the magnetic disk 1 by the head 2 and transmits the signal to the read/write channel 5 of the control unit 4. The head IC 3 converts a write signal from the read/write channel 5 of the control unit 4 to a write current and transmits the current to the head 2. The control unit 4 controls the reading/writing of the data from/to the magnetic disk 1 and controls the data refresh process to the magnetic disk 1.

The read/write channel 5 executes a signal process of the data read from/written to the magnetic disk 1. The refresh controller 6 controls the data refresh process to the magnetic disk 1. The supply voltage abnormality detecting circuit 7 detects the abnormality of the supply voltage supplied to the hard disk drive 10. When the data refresh process to the magnetic disk 1 is interrupted, the storage unit 8 stores information about a sector in which the data refresh process is interrupted. The storage unit 8 also temporarily stores the read data in the data refresh process.

In the hard disk drive 10, the magnetic disk 1, the head 2, and the head IC 3 have general configurations. In FIG. 1, a configuration related to the data refresh process in this embodiment is illustrated as a configuration of the hard disk drive 10 and a general configuration of a driver IC and the like is omitted.

The data refresh process of this embodiment is subsequently described. First, operation in a case in which the abnormality is detected in the supply voltage supplied to the hard disk drive 10 is described about difference from an operation of a conventional hard disk drive. In general, in the magnetic disk 1, the data areas and servo areas are alternatively arranged on a plurality of tracks. The data area is the area on which the data is recorded and a servo signal for positioning of the head 2 is recorded on the servo area. Meanwhile, in the following description, write operation to the magnetic disk 1 is referred to as disk write.

Figure 2:
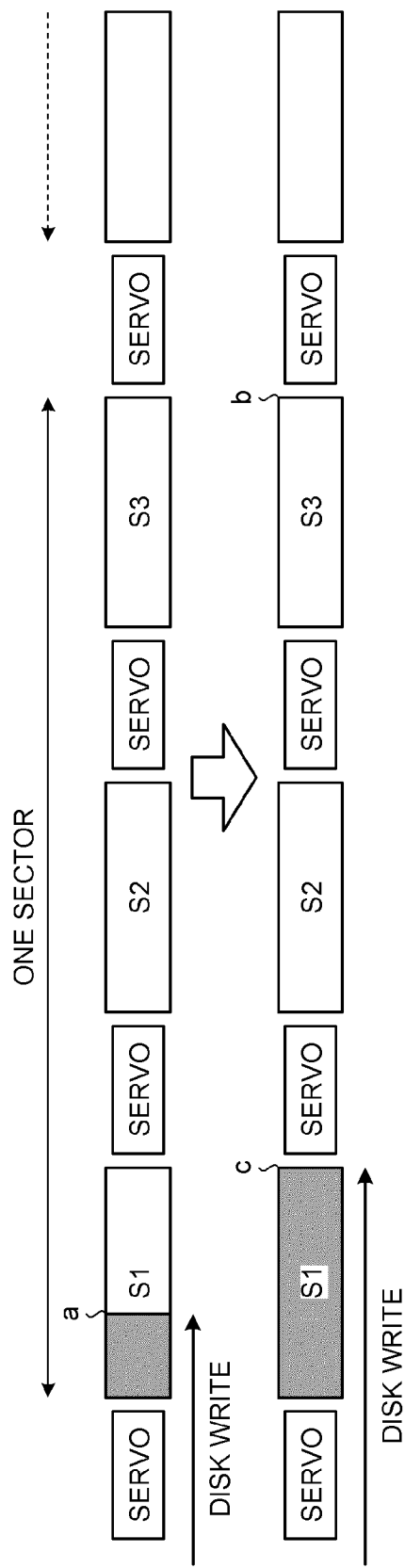
FIG. 2 is a diagram showing a state of a sector when supply voltage abnormality is detected during disk write.

FIG. 2 is a diagram illustrating a state of the sector in a case in which the supply voltage abnormality is detected during the disk write. An upper side is a state when the supply voltage abnormality is detected and a lower side is a state after the disk write is finished. Servo represents the servo area and S1 to S3 represent the data areas. One sector is a unit of the writing of the data to the magnetic disk 1. Although the data area and the servo area actually have curved shapes in a circumferential direction of the magnetic disk 1, they are herein indicated to have linear shapes for easier comparison.

In the conventional hard disk drive, when power shutdown and the like occurs and the supply voltage abnormality is detected during the disk write (point a), the process is normally finished after the writing to a sector break of one sector to which the disk write is performed (point b). However, when one sector is long, the writing cannot be performed to the end of one sector due to a supply voltage drop and write data might be interrupted in a halfway position. In this case, the sector in question becomes unreadable and the data is lost.

In the hard disk drive 10 according to this embodiment, only in the disk write during the data refresh process, when the power shutdown and the like occurs and the supply voltage abnormality is detected during the disk write (point a), the writing is not performed to the sector break of one sector to which the disk write is performed. The hard disk drive 10 finishes the disk write when the writing to the data area is completed, the data area to which the disk write is performed when the supply voltage abnormality is detected separated with a servo split break, that is to say, the servo area of one sector to which the disk writing is performed (point c). The hard disk drive 10 finishes the data refresh process without stepping over the servo area. According to this, when the abnormality such as the power shutdown occurs during the data refresh process, the disk write is not finished in a halfway position of the data area, so that data loss may be prevented, and it becomes possible to normally read the sector in question.

In a case of the data refresh process, the already recorded data is rewritten and the already recorded data remains in the data area after a split stop position. Therefore, in the hard disk drive 10, only in the disk write during the data refresh process, the sector in which the disk write is interrupted can be normally read if the writing is correctly performed to a point of the split break.

That is to say, in the hard disk drive 10 according to this embodiment, the data is not lost at the time of the data refresh process. Therefore, it is not required to back up the data during the data refresh process in the magnetic disk 1 or a non-volatile memory not illustrated in FIG. 1 when the data refresh process is started, so that time for the writing at the time of the backup of the data is not required and it becomes possible to perform the data refresh process at a higher speed than in the conventional drive.

Figure 3:
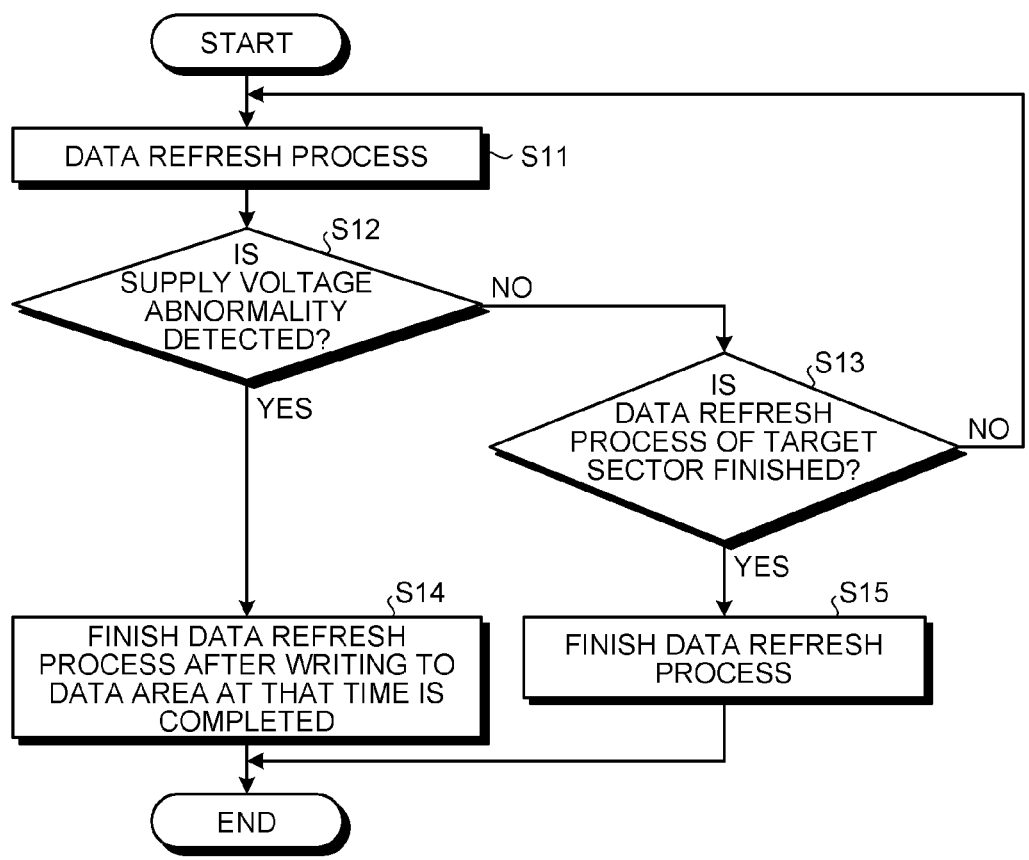
FIG. 3 is a flowchart showing a data refresh process.

FIG. 3 is a flowchart illustrating the data refresh process by the hard disk drive 10 of this embodiment.

First, in the hard disk drive 10 of this embodiment, the refresh controller 6 of the control unit 4 starts the data refresh process to the data of a track being a refresh process target to the magnetic disk 1 through the read/write channel 5 (step S11).

The supply voltage abnormality detecting circuit 7 of the control unit 4 monitors the supply voltage supplied to the control unit 4 of the hard disk drive 10 to confirm whether the supply voltage abnormality is detected (step S12).

When the abnormality of the supply voltage is not detected by the supply voltage abnormality detecting circuit 7 (step S12: No), the refresh controller 6 confirms whether the data refresh process of all the sectors in the target track is finished (step S13). When this is not finished for the target sector (step S13: No), the refresh controller 6 returns to step S11 to continue the data refresh process.

On the other hand, when the abnormality of the supply voltage is detected by the supply voltage abnormality detecting circuit 7 (step S12: Yes), the refresh controller 6 finishes the data refresh process in the middle. At that time, the refresh controller 6 finishes the disk write when the writing to the servo split break of one sector to which the disk write is performed is performed through the read/write channel 5. That is to say, the data refresh process is finished when the writing is completed for the data area to which the disk write is performed when the supply voltage abnormality is detected (step S14).

When the data refresh process of all the sectors in the target track is finished (step S13: Yes), the refresh controller 6 performs control to finish the data refresh process (step S15).

Meanwhile, in the hard disk drive 10, when the data refresh process is finished in the middle of the sector (step S14), information about the sector may be stored to be used when the data refresh process is started next time.

Suppose that the hard disk drive 10 performs the data refresh process in track units and the data refresh process is finished in the middle of the sector because the supply voltage abnormality is detected. In the hard disk drive 10, if the data refresh process is finished in the middle of the sector just after the data refresh process is started, time loss is not significant even when the data refresh process of the target track is restarted from the first. On the other hand, in the hard disk drive 10, when the data refresh process of the target track is finished in the middle of the sector just before the data refresh process finishes, it is not efficient to restart the data refresh process of the target track from the first.

Therefore, the refresh controller 6 stores information which identifies the sector in the middle of which the data refresh process is finished or information which identifies the data area in the middle of which the data refresh process is finished in the storage unit 8 as identification information when the data refresh process is finished in the middle of the sector. Then, the refresh controller 6 reads the identification information from the storage unit 8 and starts the data refresh process from the sector in the middle of which the data refresh process is finished or the data area (data area in which the data refresh process is not finished) next to the data area in which the data refresh process is finished. According to this, the hard disk drive 10 may efficiently perform the data refresh process.

According to the first embodiment, when the hard disk drive 10 detects the abnormality of the supply voltage to be supplied in the data refresh process, the hard disk drive 10 does not perform the writing to the sector break of one sector to which the disk write is performed but the hard disk drive 10 finishes the disk write when the hard disk drive 10 completes the writing to the data area separated with the servo split break, that is to say, the servo area of one sector to which the data writing is performed. According to this, the data is not lost at the time of the data refresh process, so that it is not required to back up the data when the data refresh process is started, therefore, it is possible to obtain an effect that the speed of the data refresh process is increased and speedup is realized as compared to the conventional drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive comprising:
a magnetic disk on which data is recorded in a data area separated with a servo area; and
a control unit configured to control reading and writing of the data from and to the magnetic disk, wherein
the control unit includes:
a detecting circuit configured to detect abnormality of a supply voltage supplied to the control unit; and
a refresh controller configured to, when the abnormality of the supply voltage is detected by the detecting circuit during a data refresh process in sector units to the magnetic disk, finish the data refresh process to a sector after the writing of the data to the data area is finished, the data area to which the writing is performed when the abnormality of the supply voltage is detected, without stepping over the servo area.

2. The hard disk drive according to claim 1, wherein
the refresh controller performs the data refresh process without backing up the data of the sector read from the magnetic disk to the magnetic disk or a non-volatile memory.

3. The hard disk drive according to claim 1, further comprising:
a storage unit configured to store identification information which identifies a data area in which the data refresh process is finished when the data refresh process is finished in the middle of a sector, wherein
the refresh controller reads the identification information from the storage unit and starts the data refresh process from a data area next to the data area in which the data refresh process is finished.

4. The hard disk drive according to claim 2, further comprising:
a storage unit configured to store identification information which identifies a data area in which the data refresh process is finished when the data refresh process is finished in the middle of a sector, wherein
the refresh controller reads the identification information from the storage unit and starts the data refresh process from a data area next to the data area in which the data refresh process is finished.

5. The hard disk drive according to claim 1, further comprising:
a storage unit configured to store identification information which identifies a sector in the middle of which the data refresh process is finished when the data refresh process is finished in the middle of the sector, wherein
the refresh controller reads the identification information from the storage unit and starts the data refresh process from the sector in the middle of which the data refresh process is finished.

6. The hard disk drive according to claim 2, further comprising:
a storage unit configured to store identification information which identifies a sector in the middle of which the data refresh process is finished when the data refresh process is finished in the middle of the sector, wherein
the refresh controller reads the identification information from the storage unit and starts the data refresh process from the sector in the middle of which the data refresh process is finished.

7. A data refresh method of a hard disk drive, the method comprising:
executing a data refresh process in sector units to a magnetic disk on which data is recorded in a data area separated with a servo area;
detecting abnormality of a supply voltage supplied to a control unit of the hard disk drive; and
finishing the data refresh process to a sector after writing of the data to the data area of when the abnormality of the supply voltage is detected is finished without stepping over the servo area.

8. The data refresh method according to claim 7, further comprising:
performing the data refresh process without backing up the data of the sector read from the magnetic disk to the magnetic disk or a non-volatile memory.

9. The data refresh method according to claim 7, further comprising:
storing identification information which identifies a data area in which the data refresh process is finished when the data refresh process is finished in the middle of a sector; and
starting the data refresh process from a data area next to the data area in which the data refresh process is finished based on the identification information.

10. The data refresh method according to claim 8, further comprising:
storing identification information which identifies a data area in which the data refresh process is finished when the data refresh process is finished in the middle of a sector; and
starting the data refresh process from a data area next to the data area in which the data refresh process is finished based on the identification information.

11. The data refresh method according to claim 7, further comprising:
storing identification information which identifies a sector in the middle of which the data refresh process is finished when the data refresh process is finished in the middle of the sector; and
starting the data refresh process from the sector in the middle of which the data refresh process is finished based on the identification information.

12. The data refresh method according to claim 8, further comprising:
storing identification information which identifies a sector in the middle of which the data refresh process is finished when the data refresh process is finished in the middle of the sector; and
starting the data refresh process from the sector in the middle of which the data refresh process is finished based on the identification information.

* * * * *